(12) United States Patent
Kiyama

(10) Patent No.: US 8,721,746 B2
(45) Date of Patent: May 13, 2014

(54) SOLID FUEL

(75) Inventor: Michihiro Kiyama, Hiroshima (JP)

(73) Assignee: Creative Co., Ltd., Hiroshima (JP)

( * ) Notice: Subject to any disclaimer, the term of this patent is extended or adjusted under 35 U.S.C. 154(b) by 486 days.

(21) Appl. No.: 12/517,205

(22) PCT Filed: Sep. 10, 2008

(86) PCT No.: PCT/JP2008/066335
§ 371 (c)(1),
(2), (4) Date: Jun. 2, 2009

(87) PCT Pub. No.: WO2010/004660
PCT Pub. Date: Jan. 14, 2010

(65) Prior Publication Data
US 2011/0078947 A1    Apr. 7, 2011

(30) Foreign Application Priority Data

Jul. 11, 2008 (JP) ................. 2008-181132

(51) Int. Cl.
*C10L 5/40*  (2006.01)
*C10L 5/44*  (2006.01)
*C10L 5/02*  (2006.01)
*C10L 5/34*  (2006.01)
*C10L 5/36*  (2006.01)

(52) U.S. Cl.
CPC . *C10L 5/40* (2013.01); *C10L 5/403* (2013.01); *C10L 5/406* (2013.01); *C10L 5/44* (2013.01); *C10L 5/442* (2013.01); *C10L 5/02* (2013.01); *C10L 5/34* (2013.01); *C10L 5/36* (2013.01)
USPC ................. 44/550; 44/535; 44/553; 44/589; 44/590; 44/606

(58) Field of Classification Search
CPC ............... C10L 5/02; C10L 5/34; C10L 5/36; C10L 5/403; C10L 5/406; C10L 5/442; C10L 5/40; C10L 5/44
USPC ............ 44/530, 535, 550, 589, 590, 605, 606
See application file for complete search history.

(56) References Cited

U.S. PATENT DOCUMENTS 3,947,255 A * 3/1976 Hartman et al. ................. 44/553
2009/0205546 A1 * 8/2009 Kluko ............................ 110/261

FOREIGN PATENT DOCUMENTS

| | | |
|---|---|---|
| JP | 57-057796 | 4/1982 |
| JP | 62-043490 | 2/1987 |
| JP | 7-082581 | 3/1995 |
| JP | 2002-038173 | 2/2002 |
| WO | 79/00988 | 11/1979 |
| WO | WO 7900988 A1 * | 11/1979 |

OTHER PUBLICATIONS

Search report from E.P.O. that issued with respect to patent family member European Patent Application No. 08810389.0, mail date is Nov. 2, 2011.

* cited by examiner

*Primary Examiner* — Taiwo Oladapo
(74) *Attorney, Agent, or Firm* — Greenblum & Bernstein, P.L.C.

(57) ABSTRACT

A solid fuel molded out of a mixture of wood pieces having a size of 1 to 25 mm, paper pieces having a size of 1 to 25 mm and thermoplastic resin, wherein the mixture contains 80 to 95 parts by weight of the total of the wood pieces and the paper pieces and 5 to 15 parts by weight of the thermoplastic resin, and the weight ratio of the wood pieces to the paper pieces is 20:80 to 90:10.

The solid fuel which generates a stable amount of heat is manufactured by using waste wood, waste paper and waste thermoplastic resin in a well-balanced ratio.

6 Claims, No Drawings

SOLID FUEL

RELATED APPLICATION

This application is a national stage entry of PCT/JP2008/066335, filed Sep. 10, 2008 which claims priority from Japanese Patent Application No. 2008-181132, filed Jul. 11, 2008, which is incorporated by reference in its entirety.

FIELD OF THE INVENTION

The present invention relates to a solid fuel. More specifically, it relates to a solid fuel obtained by making effective use of waste wood, waste paper and waste plastics. Much more specifically, it relates to a solid fuel which is obtained by making effective use of wood, paper and plastic wastes, produces a harmful gas and a residue in as small quantities as possible after combustion and generates a large amount of heat, especially a solid fuel suitable for use as a fuel for generating electric power.

DESCRIPTION OF THE PRIOR ART

Along with the modernization of living, wastes such as wood wastes, paper wastes and plastics are produced in large quantities from domestic lives, production plants, processing plants, etc. and the disposal of these wastes is now a social problem. Most of these wastes are collected and burnt or buried underground. However, the proportion of wastes which are recycled into everyday goods or used as energy sources after they are collected is gradually increasing but still unsatisfactory.

Especially parts of waste wood from old houses, thinned wood and waste paper have been burnt because the collection and sorting of these wastes cost a great deal and the recycling of these is difficult. Meanwhile, as for waste plastics, although PET-bottles are partially collected and recycled mainly by local governments, most of other plastics have been unrecycled and burnt because there are large numbers of types and shapes of resins and the costs of the collection and sorting of these resins are huge.

SUMMARY OF THE INVENTION

Then, the inventors of the present invention have conducted inventive studies in order to develop a solid fuel which can be obtained by using waste wood and waste paper which have been difficult to be recycled and waste plastics which have been difficult to be sorted out as energy sources without burning them.

As a result, they have found that when waste wood and waste paper are broken into pieces of a predetermined size, waste wood is used in a predetermined ratio, a predetermined small amount of waste plastics is mixed with these, and the resulting mixture is heated and molded, the obtained product is effective as a solid fuel for generating electric power which can maintain a solid shape with a predetermined size due to the function of the plastics as a binder, generates a large amount of heat as a fuel and produces very small amounts of a harmful gas and a harmful residue.

According to the present invention, there can be provided a solid fuel which can be used to generate electric power as an energy source, especially a clean energy source by making effective use of waste wood, waste paper and waste plastics which have had no utility value and have been burnt.

Patent document 1 proposes a solid fuel obtained from waste paper and waste plastics. This solid fuel actually comprises 25 to 100 parts by weight of waste plastics based on 100 parts by weight of waste paper, and a relatively large amount of waste plastics is used (20 to 50 wt % as a whole). This patent publication teaches that waste wood may be blended more but the amount of waste wood used in Examples is no more than 10 wt % of the total. The above solid fuel contains waste plastics in a relatively large proportion and therefore, the step of dechlorinating the obtained solid fuel by heating it is required to suppress a trouble at the time of combustion due to the inclusion of polyvinyl chloride.

Patent Document 1: JP-A 7-82581

According to the present invention, there is provided a solid fuel specified in the following paragraphs (1) to (6).

(1) A solid fuel molded out of a mixture of wood pieces having a size of 1 to 25 mm, paper pieces having a size of 1 to 25 mm and thermoplastic resin, wherein the mixture contains 80 to 95 parts by weight of the total of the wood pieces and the paper pieces and 5 to 15 parts by weight of the thermoplastic resin, and the weight ratio of the wood pieces to the paper pieces is 20:80 to 90:10.

(2) The solid fuel according to the above paragraph (1), wherein the average size of each piece is 15 to 60 $cm^3$.

(3) The solid fuel according to the above paragraph (1) which has a cylindrical shape.

(4) The solid fuel according to the above paragraph (1) which has an apparent specific gravity of 0.4 to 0.5 $g/cm^3$.

(5) The solid fuel according to the above paragraph (1) which generates 20 to 30 MJ/kg of heat.

(6) The solid fuel according to the above paragraph (1) which is used to generate electric power.

The solid fuel of the present invention is obtained by making use of waste wood, waste paper and waste plastics in a well-balanced ratio and can be effectively used as a new energy source, especially an energy source for generating electric power.

The solid fuel of the present invention can be a new solid fuel which is obtained by making use of wood, paper and plastic wastes which have been burnt, produces very small amounts of a harmful gas and a harmful residue and generates a large amount of heat.

Especially in the solid fuel of the present invention, when waste wood is broken into pieces of a specific size and used in a predetermined proportion, even though a resin is used in a relatively small proportion, the resin serves effectively as a binder, thereby making it possible to mold a solid fuel. Since the amount of generated heat can be controlled by using a small amount of the resin and the amount of a chlorine-based resin such as polyvinyl chloride can be reduced as much as possible, a dechlorination operation such as a heat treatment is not required.

DESCRIPTION OF THE PREFERRED EMBODIMENTS

The solid fuel of the present invention is a solid obtained by molding a mixture of wood pieces, paper pieces and thermoplastic resin, and wastes to be disposed of are used as these raw materials. The ratio of the raw materials and a molding method will be described hereinbelow.

(a) Wood Pieces

Waste wood collected by breaking down old furniture and buildings such as old houses, wood chips and end pieces from sawmills, thinned wood and used pallets are used as the raw materials of the wood pieces. The type of the wood is not particularly limited. When the above waste wood is dry, it is used as it is and when it contains water, it is dried and crushed. Wood chips collected from sawmills may be used as they are without being crushed when the sizes of the wood chips fall within the range which will be described hereinafter.

The wood pieces obtained by crushing are 1 to 25 mm, preferably 2 to 20 mm in size. The term "size" as used herein means the maximum diameter of each wood piece. Stated more specifically, wood pieces passing through a sieve having an opening of 25 mm or less, preferably 20 mm or less may be used as the raw materials. The shapes of the wood pieces are not particularly limited as long as they are crushed by a rotary crushing machine having teeth. The wood pieces are desirably dry wood pieces having a water content of 20 wt % or less, preferably 15 wt % or less.

(b) Paper Pieces

The raw materials of the paper pieces are not only waste paper recycled as reclaimed paper, such as secondhand books, newspaper, cardboards and office paper but also coated paper and laminated paper which are hardly recycled as reclaimed paper. These paper raw materials are cut to a size of 1 to 25 mm, preferably 2 to 20 mm. The term "size" as used herein means the size of paper pieces passing through a sieve having an opening of 25 mm or less, preferably 20 mm or less. The paper pieces used as the raw materials are preferably dry but may contain water in an amount of 15 wt % or less, preferably 10 wt % or less.

(c) Thermoplastic Resin

What are collected as waste plastics are used as the thermoplastic resin, and plastics having a melting point of 80 to 180° C., preferably 90 to 150° C. are appropriate. Examples of the thermoplastic resin include polyethylene, polypropylene, polystyrene, polyesters, polycarbonates, ABS, acrylic resin, polyurethane resin, polyvinyl acetate resin and rubbers. Since waste plastics are used, they are generally used as a mixture. Although polyvinyl chloride is not preferred because it generates a harmful gas when it is burnt, the content of the resin in the solid fuel of the present invention is relatively low and therefore, the inclusion of a small amount of polyvinyl chloride into the resin rarely causes a problem.

When a thermosetting resin is mixed into the thermoplastic resin in an amount of 15 wt % or less, preferably 10 wt % or less, there is no problem as long as molding is not interrupted.

Since the thermoplastic resin serves as a binder when it is mixed with wood pieces and paper pieces, it is desired that it should be crushed into small pieces so that it can be closely and fully mixed with and dispersed into these pieces. Specifically, the resin pieces desirably have a diameter of 50 mm or less, preferably 40 mm or less. To this end, after it is crushed, pieces passing through a sieve having an opening of 50 mm or less, preferably 40 mm or less are used. The thermoplastic resin may be obtained by remelting waste plastics and forming them into chips or pellets having the above size.

(d) Composition

The weight ratio of the wood pieces to the paper pieces in the solid fuel of the present invention is 20:80 to 90:10, preferably 25:75 to 85:15, particularly preferably 30:70 to 80:20. Within the above range, they can be hardened by using a relatively small amount of the resin and the well-balanced recycling of the waste wood and the waste paper becomes possible, whereby the amount of generated heat becomes stable. The amount of the thermoplastic resin is 5 to 15 parts by weight based on 85 to 95 parts by weight of the total of the wood pieces and the paper pieces. Preferably, the amount of the thermoplastic resin is 7 to 13 parts by weight based on 87 to 93 parts by weight of the total of the wood pieces and the paper pieces.

(e) Molding Method

It is preferred that the above wood pieces, paper pieces and thermoplastic resin should be mixed together in the above ratio and that the resulting mixture should be heated at 100 to 160° C., preferably 110 to 150° C., particularly preferably 120 to 140° C. and pressurized and compressed so that the thermoplastic resin is molten and closely dispersed as a binder.

It is particularly preferred that the wood pieces and the paper pieces should be mixed together in advance and that the thermoplastic resin should be mixed with the resulting mixture. A single-screw or double-screw heating extruder may be used as the machine for mixing and heating them.

The use of a double-screw extruder is particularly desirable. A composition which is compressed and extruded by the extruder is discharged from a circular nozzle and cut to a suitable length to obtain a cylindrical molded product.

When the diameter of the circular nozzle is set to 25 to 50 mm, preferably 30 to 40 mm and the cutting length is set to 20 to 70 mm, preferably 25 to 65 mm at this point, a solid fuel having a desirable size can be obtained.

(f) Characteristic Properties of Solid Fuel

Since it is industrially preferred to manufacture the solid fuel of the present invention by the above-described molding method, the shape of the solid fuel is desirably cylindrical or prismatic, particularly preferably cylindrical. As for the size of the solid fuel, the volume of each piece is 15 to 60 $cm^3$, preferably 20 to 55 $cm^3$ on average.

The apparent specific gravity of the solid fuel is 0.4 to 0.5 $g/cm^3$, preferably 0.42 to 0.48 $g/cm^3$.

Since the contents of the wood pieces and the paper pieces are well balanced and the content of the thermoplastic resin is relatively low in the solid fuel, the amount of generated heat is stable at 20 to 30 MJ/kg, preferably 22 to 28 MJ/kg. Therefore, since the solid fuel of the present invention is obtained by making use of waste wood, waste paper and waste plastics in a well-balanced ratio and the amount of its generated heat is large and stable, it is advantageously used as a fuel for generating thermal power.

EXAMPLES

The following examples are provided to further illustrate the present invention.

The wood pieces, paper pieces and thermoplastic resin used in the following examples are described below.

(1) Wood Pieces;

The wood pieces (size of 25 mm or less) were obtained by crushing waste wood such as waste wood obtained from construction materials and end pieces obtained by sawing lumber.

(2) Paper Pieces;

The paper pieces (size of 25 mm or less) were obtained by crushing package paper wastes and paper wastes having a protective film.

(3) Thermoplastic Resin

The thermoplastic resin (size of 40 mm or less) was a crushed product of a mixture of polypropylene (PP), polyethylene (PE), polystyrene (PS), ABS resin, polyethylene terephthalate (PET), polycarbonate (PC) and polyacrylate resin (PA).

Example 1

10 parts by weight of thermoplastic resin was mixed with a mixture of 80 parts by weight of wood pieces and 10 parts by weight of paper pieces, and the resulting mixture was extruded by a double-screw extruder heated at 130° C. to obtain a cylindrical solid fuel having a diameter of about 35 mm (length of 65 mm). The apparent specific gravity (bulk specific gravity), amount of generated heat and chlorine content of this solid fuel are shown in Table 1.

Example 2

A cylindrical solid fuel (length of 60 mm) was obtained in the same manner as in Example 1 except that the amounts of the wood pieces, paper pieces and thermoplastic resin were changed to 45 parts by weight, 45 parts by weight and 10 parts by weight, respectively, and that the heating temperature was changed to 125° C. The apparent specific gravity (bulk specific gravity), amount of generated heat and chlorine content of this solid fuel are shown in Table 1.

Example 3

A cylindrical solid fuel (length of 60 mm) was obtained in the same manner as in Example 1 except that the amounts of the wood pieces, paper pieces and thermoplastic resin were changed to 50 parts by weight, 40 parts by weight and 10 parts by weight, respectively, and that the heating temperature was changed to 125° C. The apparent specific gravity, amount of generated heat and chlorine content of this solid fuel are shown in Table 1.

Example 4

A cylindrical solid fuel (length of 10 mm) was obtained in the same manner as in Example 1 except that the amounts of the wood pieces, paper pieces and thermoplastic resin were changed to 50 parts by weight, 45 parts by weight and 5 parts by weight, respectively, and that the heating temperature was changed to 120° C. The apparent specific gravity, amount of generated heat and chlorine content of this solid fuel are shown in Table 1.

Example 5

A cylindrical solid fuel (length of 70 mm) was obtained in the same manner as in Example 1 except that the amounts of the wood pieces, paper pieces and thermoplastic resin were changed to 45 parts by weight, 40 parts by weight and 15 parts by weight, respectively, and that the heating temperature was changed to 125° C. The apparent specific gravity, amount of generated heat and chlorine content of this solid fuel are shown in Table 1.

TABLE 1

| | | | product: solid fuel | | | |
|---|---|---|---|---|---|---|
| | mixing condition | size | bulk specific | amount of heat | | chlorine |
| | (molding temperature) | (length) mm | gravity g/cm$^2$ | joule: MJ/Kg | calorie: cal/g | content % |
| Ex. 1 | 130° C. | 65 mm | 0.45 | 25.159 | 6010 | 0.186 |
| Ex. 2 | 125° C. | 60 mm | 0.42 | 25.2 | 6020 | 0.254 |
| Ex. 3 | 125° C. | 60 mm | 0.37 | 25.179 | 6015 | 0.247 |
| Ex. 4 | 120° C. | 10 mm | 0.41 | 24.07 | 5750 | 0.294 |
| Ex. 5 | 125° C. | 70 mm | 0.43 | 26.373 | 6300 | 0.218 |

What is claimed is:

1. A solid fuel, which has a bulk specific gravity of 0.4 to 0.5 g/cm$^3$, molded out of a mixture of wood pieces having a size of 1 to 25 mm, paper pieces having a size of 1 to 25 mm and thermoplastic resin, wherein the mixture contains 85 to 95 parts by weight of the total of the wood pieces and the paper pieces and 5 to 15 parts by weight of the thermoplastic resin, and the weight ratio of the wood pieces to the paper pieces is 30:70 to 80:20.

2. The solid fuel according to claim 1, wherein the average volume of the solid fuel is 15 to 60 cm$^3$.

3. The solid fuel according to claim 1 which has a cylindrical shape.

4. The solid fuel according to claim 1 which generates 20 to 30 MJ/kg of heat.

5. A method for supplying heat to an electrical generating plant comprising burning the solid fuel according to claim 1.

6. In combination, at least one of A) an industrial boiler and an electrical generating plant; and, B) the solid fuel according to claim 1.

* * * * *